United States Patent
Crombez et al.

(10) Patent No.: US 9,457,684 B2
(45) Date of Patent: Oct. 4, 2016

(54) REDUNDANT ELECTRICAL POWER FOR AUTONOMOUS VEHICLES

(71) Applicant: Ford Global Technologies, LLC, Dearborn, MI (US)

(72) Inventors: Dale Scott Crombez, Livonia, MI (US); Jerome Charles Ivan, Troy, MI (US); James Robert McBride, Saline, MI (US); Wayne Williams, Livonia, MI (US); Paul Joseph Szuszman, Ann Arbor, MI (US); Roger Arnold Trombley, Ann Arbor, MI (US); Peter Worrel, Troy, MI (US); Hai Yu, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 21 days.

(21) Appl. No.: 14/226,234

(22) Filed: Mar. 26, 2014

(65) Prior Publication Data
US 2015/0274027 A1 Oct. 1, 2015

(51) Int. Cl.
*B60L 11/18* (2006.01)
*B60L 1/00* (2006.01)
*B60L 3/00* (2006.01)

(52) U.S. Cl.
CPC ........ *B60L 11/1853* (2013.01); *B60L 11/1851* (2013.01); *B60L 11/1861* (2013.01); *B60L 11/1868* (2013.01); *B60L 11/1877* (2013.01); *B60L 1/00* (2013.01); *B60L 3/0092* (2013.01); *Y02T 10/7005* (2013.01); *Y02T 10/7044* (2013.01); *Y02T 10/7066* (2013.01); *Y10S 903/903* (2013.01)

(58) Field of Classification Search
CPC ............ B60L 11/1851; B60L 11/1853; B60L 11/1861; B60L 11/1868; B60L 11/1877
See application file for complete search history.

(56) References Cited

U.S. PATENT DOCUMENTS

| | | | | |
|---|---|---|---|---|
| 4,313,080 A | * | 1/1982 | Park | B60L 11/1866 180/65.225 |
| 5,488,283 A | * | 1/1996 | Dougherty | H01M 10/425 307/10.1 |
| 6,781,343 B1 | * | 8/2004 | Demachi et al. | 320/101 |
| 6,828,742 B2 | * | 12/2004 | Suzuki et al. | 318/139 |
| 7,075,194 B2 | * | 7/2006 | Weidenheimer | H02J 7/0024 307/10.1 |
| 7,235,898 B1 | | 6/2007 | Jones, III et al. | |

(Continued)

FOREIGN PATENT DOCUMENTS

| | | |
|---|---|---|
| CN | 201994701 U | 9/2011 |
| CN | 201994701US | 9/2011 |

(Continued)

OTHER PUBLICATIONS

GB Search Report dated Oct. 20, 2015 (7 pages).
(Continued)

*Primary Examiner* — Dale W Hilgendorf
(74) *Attorney, Agent, or Firm* — Frank MacKenzie; Bejin Bieneman PLC

(57) ABSTRACT

A system includes a first battery configured to power at least one vehicle subsystem and a second battery configured to power an electric motor to propel a vehicle. A processing device is configured to detect an inadequate power level provided from the first battery to the at least one vehicle subsystem and selectively partition the second battery to power the at least one vehicle subsystem.

19 Claims, 5 Drawing Sheets

(56) References Cited

U.S. PATENT DOCUMENTS

| | | | |
|---|---|---|---|
| 7,456,521 B2* | 11/2008 | Weidenheimer | H02J 7/0024 307/71 |
| 8,039,976 B2* | 10/2011 | Sato | B60L 11/1868 290/40 C |
| 8,400,012 B2* | 3/2013 | Weidenheimer | H02J 7/0024 307/71 |
| 8,410,755 B2 | 4/2013 | Chau | |
| 2003/0071523 A1* | 4/2003 | Silverman | H01M 10/428 307/150 |
| 2005/0035656 A1 | 2/2005 | Kuramochi et al. | |
| 2007/0247003 A1* | 10/2007 | Elder | B60L 11/1851 307/10.1 |
| 2008/0218104 A1 | 9/2008 | Lukic et al. | |
| 2009/0107743 A1* | 4/2009 | Alston et al. | 320/104 |
| 2009/0212626 A1* | 8/2009 | Snyder | B60L 11/1868 307/10.1 |
| 2010/0001523 A1* | 1/2010 | Sato et al. | 290/31 |
| 2010/0133025 A1* | 6/2010 | Flett | 701/22 |
| 2010/0261043 A1* | 10/2010 | Kim | H01M 10/482 429/61 |
| 2012/0256568 A1* | 10/2012 | Lee | 320/137 |
| 2013/0127400 A1 | 5/2013 | Oh et al. | |

FOREIGN PATENT DOCUMENTS

| | | |
|---|---|---|
| EP | 1832464 A2 | 9/2007 |
| EP | 2587618 A2 | 5/2013 |
| WO | WO 2007141795 | 12/2007 |
| WO | 2011002482 | 1/2011 |

OTHER PUBLICATIONS

GB 1505073.5 Search Report dated Oct. 20, 2015 (7 pages).

* cited by examiner

REDUNDANT ELECTRICAL POWER FOR AUTONOMOUS VEHICLES

BACKGROUND

An autonomous vehicle, also known as a driverless or robot car, is an automated vehicle in which there is no human driver. In an autonomous vehicle that is transporting human passengers, without a human driver able to bring the moving vehicle to a halt, a potentially failing subsystem such as, e.g., power brakes, power steering, robotic steering controller, robotic braking controller, robotic accelerator controller etc., is a risk that must be mitigated. One possible reason for a subsystem failure is loss, or deterioration, of automotive-battery electrical power in a hybrid autonomous vehicle, where such power would otherwise normally be properly supplied to that subsystem.

DETAILED DESCRIPTION OF PREFERRED EMBODIMENTS

Figure 1:
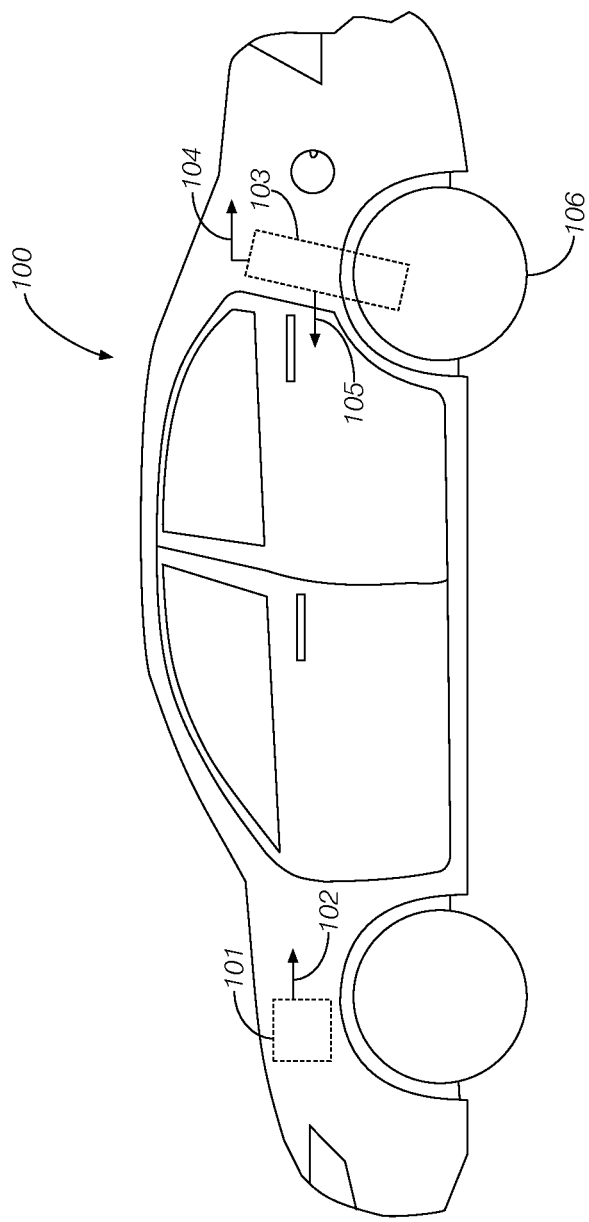
FIG. 1 depicts a profile of an autonomous hybrid vehicle.

In this description, the same reference numeral in different Figs. refers to the same entity. Otherwise, reference numerals of each FIG. start with the same number as the number of that FIG. For example, FIG. 3 has numerals in the "300" category and FIG. 4 has numerals in the "400" category, etc.

In overview, the disclosed vehicle and systems mitigate a potential hazard in an autonomous and hybrid vehicle in motion, that hazard being a failure or deterioration of automotive battery power to one or more subsystems of the moving vehicle. Under normal conditions, an automotive battery powers a plurality of such vehicle's subsystems and a hybrid battery powers an electric motor to provide torque to propel the vehicle. The automotive battery is normally located under the hood while the hybrid battery is normally positioned elsewhere such as under the rear seat or between the rear seat and the trunk.

The disclosed vehicle includes a monitor with a processing device for monitoring signals from the vehicle's subsystems and controlling the hybrid battery. Responsive to one of the signals signifying loss or reduction of power from the automotive battery to a subsystem, the processing device directs the hybrid battery to provide a first substitute voltage at a first power level on a first voltage tap conductively connected from the hybrid battery to the failing subsystem. The first substitute voltage and first power are equivalent to that which normally would be supplied by the automotive battery to that subsystem to meet the power demands of that subsystem.

At the time of receipt of the signal signifying such loss of power, the computerized processing device can dynamically re-partition and/or interconnect the individual voltaic cells in the hybrid battery, if needed. This could be needed if power output from a previously selected partition of cells is inadequate for the backup requirement imposed by the failing subsystem. The hybrid battery thus provides the first substitute voltage on the first voltage tap or, if preferable, onto a second voltage tap also connected from the hybrid battery to the failing system, while allowing the hybrid battery to continue to output sufficient voltage to maintain sufficient torque to move the vehicle.

In one possible implementation, connection from a selected partition of cells to a currently selected tab of the hybrid battery is made dynamically under computer control. The connection is made internal to the battery and is responsive to a signal denoting a particular failing subsystem to which the selected tab is directly connected. The conductive power line is directly connected from that selected tab to the failing subsystem load. In another possible approach, tabs are pre-connected to respective partitions of cells inside the hybrid battery and a relay switch in the conductive power line may be closed to allow substitute power to be applied to the failing subsystem load.

FIG. 1 depicts a profile of an autonomous hybrid vehicle, e.g., a typical passenger automobile 100, in which the above-described concepts may be implemented. Automotive battery 101, typically a twelve volt lead acid battery with high amperage starting capacity, is located under the hood of the car. Power from this battery may be used to start the car's engine. In addition, this battery 101 may provide electrical power 102 to subsystems of the automobile 100, such as robotic steering, robotic braking, robotic accelerating (none shown) as well as the more familiar subsystems: headlights, cabin lights, air conditioning, heating, windshield wipers, power seats, power windows, etc. (none shown).

Because automobile 100 may be a hybrid vehicle, not only may the vehicle's motion be derived from its internal combustion engine (not shown), but it may also derived from a relatively large (i.e., higher voltage) hybrid battery 103 located under/behind the back seat and typically extending into the area under/in the trunk. Hybrid battery 103, which may be constructed from electrochemical or voltaic cells such as a number of Nickel Metal Hydride (NiMH) cells, strung in a series and/or parallel configuration, may provide an output voltage 104 of up to 300 volts or more. This output voltage may be at sufficiently high power to energize an electrical motor (not shown) to rotate a shaft (not shown) which turns rear wheels 106 resulting in translational motion of the vehicle. Hybrid battery 103 may be used as a backup to battery 101 offering substitute power to vehicle subsystems failing due to loss of automotive battery power.

Figure 2:
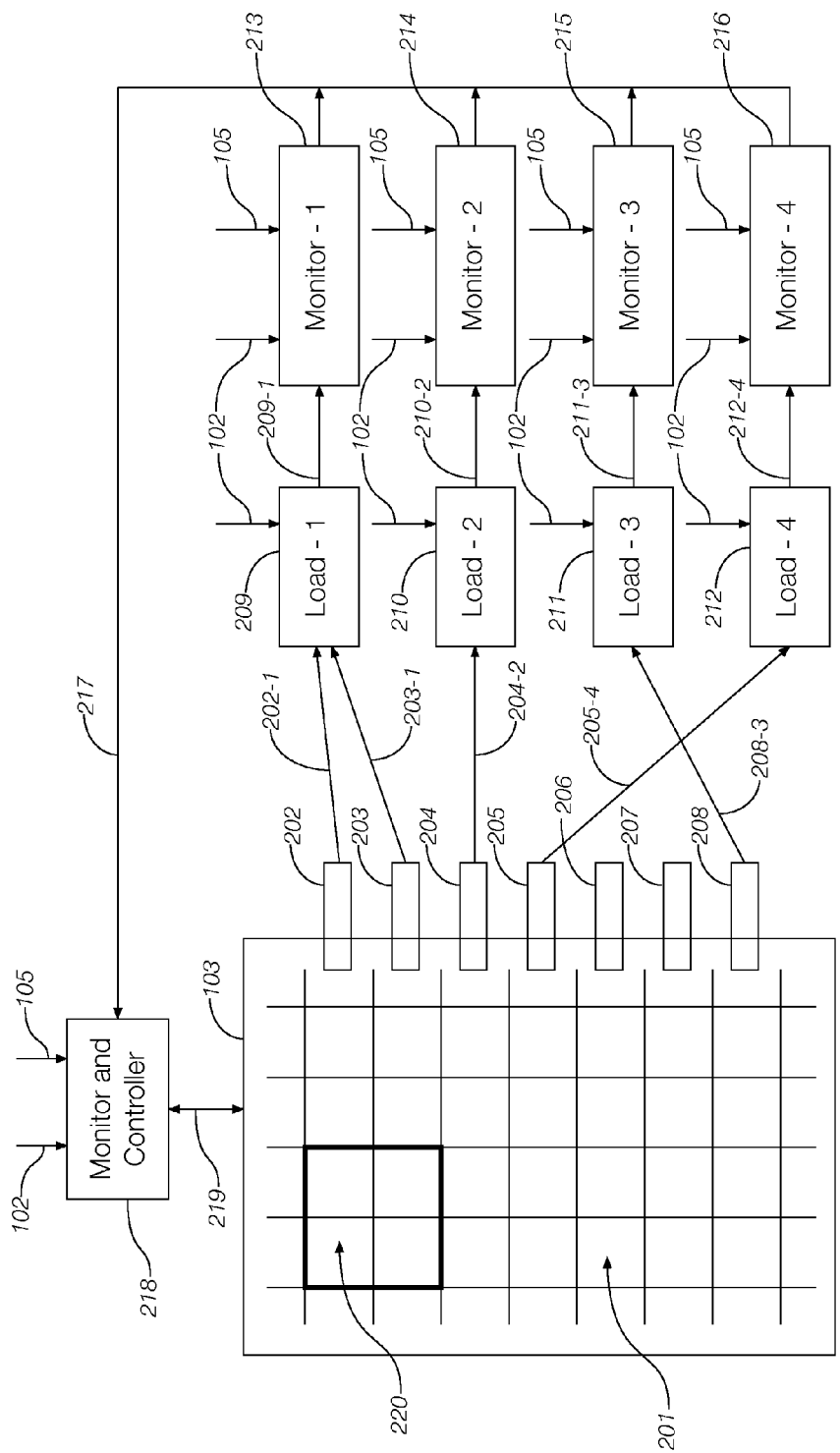
FIG. 2 is a diagram of an exemplary system that may be used in the vehicle of FIG. 1.

FIG. 2 is a diagram of an exemplary system that may be used in the vehicle of FIG. 1. Hybrid battery 103 is shown in FIG. 2 as having a matrix or plurality of voltaic cells 201 which are switchable into various series, parallel, and series/parallel configurations, as further described below in connection with cell matrix 201 detailed in FIG. 3. Partitioned cells 220 (in bold outline) are an example of one partitioned subset of the entire plurality of cells 201. Various other partitions (not shown) may be established throughout cell matrix 201 in a default configuration to achieve various output power levels per partitioned group of cells to serve as backup for different subsystems that may have different voltage/power requirements. However, since an automotive battery, typically providing twelve volts output, is powering all subsystems, each partition may be capable of providing a different maximum current, but all at the same output voltage level (e.g., 12 volts). The partitions may be also dynamically established or changed by operation of monitor and computerized processing device 218 (sometimes referred to hereinafter only as "processing device") which controls switching between and interconnection of the cells, discussed below.

Battery 103 provides output voltage tabs 202-208 for connection to subsystem loads. The tabs may also be internally connected to cells 201 (connections not shown). One of the tabs may connect to cells of partition 220 (connection not shown). These connections are further described below with respect to FIG. 3. Tab 202 is shown connected to first load 209 via conductive line 202-1. Tab 203 is also shown connected to first load 209 via conductive line 203-1. Tab 204 is shown connected to second load 210 via conductive line 204-2. Tab 205 is shown connected to fourth load 212 via conductive line 205-4. Tabs 206 and 207 are not connected to loads. And, tab 208 is shown connected to third load 211 via conductive line 208-3.

Each of subsystem loads 209-212 (only four loads are depicted for ease of presentation, but any reasonable number of vehicle loads can be backed-up by the system of FIG. 2) may be powered by automotive battery output 102, as shown, under normal conditions. Each of subsystem loads 209-212 is connected to, and monitored by, its respective local monitor 213-216. Monitors 213-216 are powered by both automotive battery 101 and hybrid battery 103 as shown by power inputs 102 and 105. This may ensure that these monitors shall not fail for lack of power if there is a catastrophic automotive battery 101 failure.

Outputs of local monitors 213-216 may be connected to the input of hybrid battery processing device 218 via conductive line 217. The output of processing device 218 is connected to battery 103 via bidirectional communication line 219 to provide commands for dynamically partitioning voltaic cell matrix 201 and for internally connecting one or more of tabs 202-208 to matrix 201 to enable those connected tabs to provide power outputs to various loads. Computerized processing device 218 may be powered by both automotive battery 101 and hybrid battery 103 as shown by power inputs 102 and 105 to ensure that processing device 218 shall not fail for lack of power if there is a catastrophic automotive battery failure.

In operation, if automotive battery power 102 fails e.g., only with respect to first load 209 (which could be a critical subsystem, such as robotic steering in an autonomous vehicle), a signal may be generated on line 209-1 to the input of local monitor 213. That signal could be the loss of a voltage, from some previous finite value based on automotive battery power 102 to some low or zero value, when automotive battery power 102 diminishes below a threshold or goes to zero. Monitor 213 may immediately generate an alarm signal on line 217 which may be transmitted to, and received by, hybrid battery monitor and processing device 218. Monitors 213-216 may each serve the same function as the monitor portion of monitor and processing device 218, and if local monitors 213-216 are implemented, one for each subsystem, the monitor function in monitor and processing device 218 need not be used, and vice versa. Each such monitoring setup represents a different embodiment.

Processing device 218 may be programmed with a dedicated software application to enable it to analyze the state of interconnection of cells 201, and then provide the appropriate command on line 219 to connect tab 202 to the appropriate partitioned group of voltaic cells in matrix or grid 201. That partitioned group may generate voltage and power on tab 202 compatible with voltage/power requirements of first load 209. In this example there is shown another tab 203 which could have been selected by processing device 218 to provide the backup power to first load 209, instead of tab 202, if the computer operation in processing device 218 determines that the configuration of cells in matrix 201 resulting from use of tab 203 and its associated partition of cells would have resulted in better overall usage management of all cells in matrix 201.

If automotive battery power 102 fails for second load 210, its substitute power may be provided via tab 204 which is connected to its appropriate partitioned cells in matrix 201 under a command from processing device 218. If automotive battery power 102 fails for third load 211, its substitute power may be provided via tab 208 which is connected to its appropriate partitioned cells in matrix 201 under a command from processing device 218. If automotive battery power 102 fails for fourth load 212, its substitute power may be provided via tab 205 which is connected to its appropriate partitioned cells in matrix 201 under a command from processing device 218. Tab 205 and fourth load 212 may be cross connected with respect to tab 208 and third load 211 to illustrate that there need not be a uniform or linear correlation between tabs and loads; the configuration of connected voltaic cells in matrix 201, as determined by operation of the computer in processing device 218, can function with cross connections.

In one possible implementation, conductive lines 202-1, 203-1, 204-2, 205-4 and 208-3 may be fixed in place, as shown, and one or more of tabs 202-208 may be switched internal to battery 103 under commands from processing device 218 to make contact with various cell partitions as may be needed to provide backup voltage/power to its respective load. In another implementation, tabs 202-208 may each be permanently connected (not shown) to different cells in matrix 201 inside battery 103 and each of the conductive lines 202-1, 203-1, 204-2, 205-4 and 208-3 includes a switch (e.g., a relay switch, not shown) which is closed by command signals from processing device 218 if a conductive line's respective load needs backup power.

Figure 3:
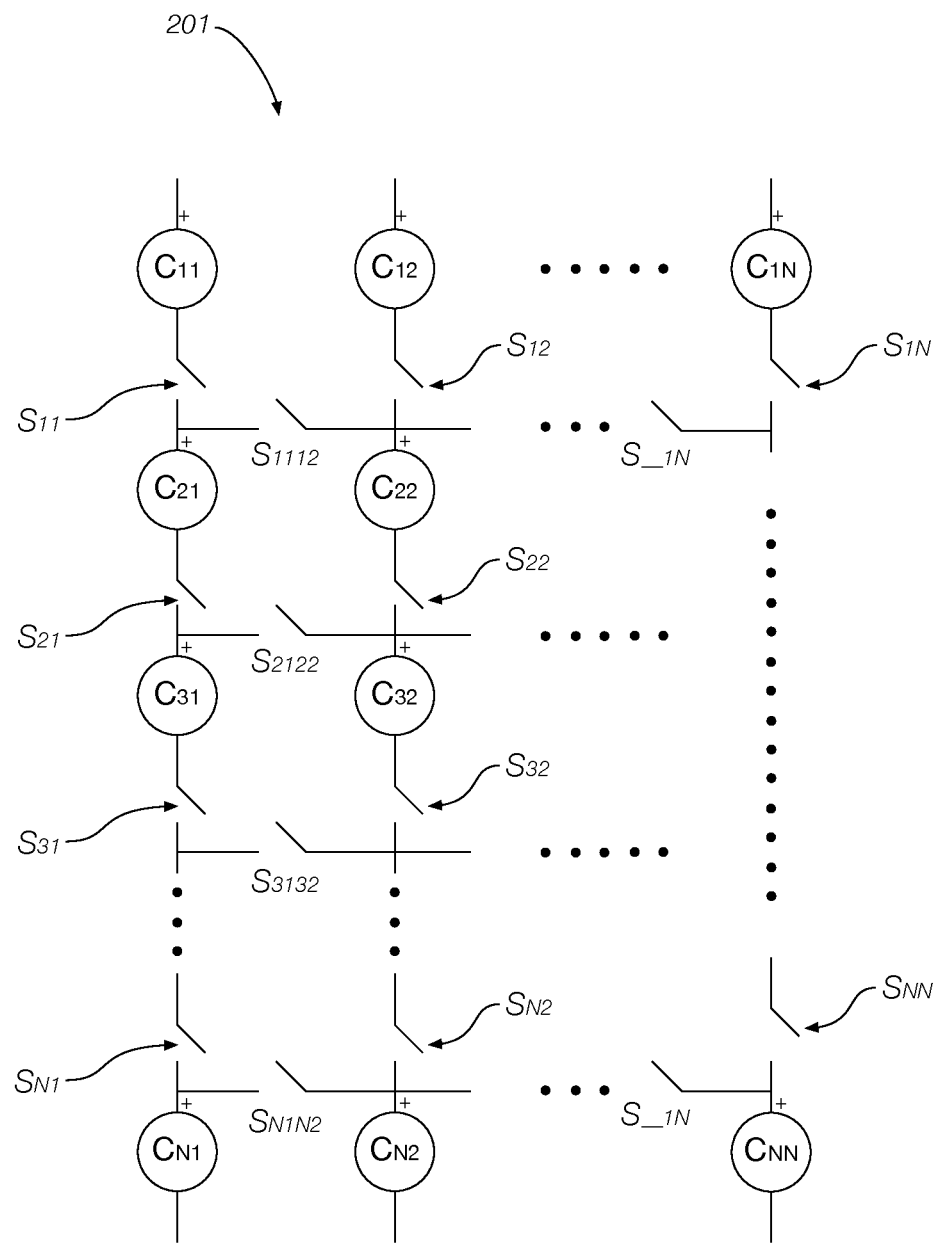
FIG. 3 is a schematic diagram of an exemplary distribution of voltaic cells having a matrix from which partitioned subsets can be used for backup power purposes.

FIG. 3 is a schematic diagram of an exemplary distribution, or matrix, of voltaic cells 201 collectively comprising a hybrid vehicle's torque-producing battery under normal conditions. The matrix of cells, with polarities as shown, can be viewed as having horizontal rows and vertical columns. In the left-hand side of FIG. 3, the first column cells are labeled from $C_{11}$ to $C_{N1}$. In the right-hand side of FIG. 3, the last column cells are labeled from $C_{1N}$ to $C_{NN}$. In the top row of FIG. 3, the top row cells are labeled from $C_{11}$ to $C_{1N}$. In the bottom row of FIG. 3, the bottom row cells are labeled from $C_{N1}$ to $C_{NN}$. In the absence of a backup power requirement, all cells and partitions of cells can be harnessed to provide maximum power output to an onboard electrical motor (not shown) for torque producing purposes.

Under failing subsystem conditions due to subsystem automotive battery power loss, FIG. 3 becomes a matrix of cells from which partitioned subsets can be created and used for backup power purposes, provided that the subsets were not previously established. The subsets are determined by operation of computerized processing device 218. Each cell has a positive and a negative terminal and a computer controlled switch. For example, in the upper left of FIG. 3, cell $C_{11}$ has switch $S_{11}$ in its negative polarity line. In addition, there are cross switches, such as switch $S_{1112}$ potentially connecting negative polarity lines of $C_{11}$ and $C_{12}$, etc. to enable series connections, parallel connections and series-parallel connections as well as to provide isolation of a group of cells in a first partition from another group of cells in a different partition. Partitions need not be square (as depicted) or rectangular in shape but can be irregularly shaped. By controlling which switches are open and which are closed processing device 218 can configure the plurality of voltaic cells into various partitions, each partition potentially providing an appropriate backup voltage and power level for its intended subsystem load via the relevant output tab. If multiple partitions are simultaneously needed for power backup for multiple loads, there may be insufficient power remaining in the hybrid battery for propelling the vehicle, and the vehicle would then stop.

In one possible approach, the vehicle 100 may operate in a "limp home" mode following a partial power failure in some of the partitions of the battery 103. When this occurs, the vehicle 100 may be configured to prioritize the systems that are needed to get the vehicle off the road. Systems that may be given higher priority in the "limp home" mode may include the steering system and the propulsion system. At night, the lighting system may also be given a higher priority. Power may be diverted from non-essential systems so that such systems may be shut down. When operating in the "limp home" mode, the controller 218 may determine the driving range of the vehicle 100 based on, e.g., the state of charge of the battery 103, and whether to pull over to the side of the road immediately, the next exit, or another suitable location. The vehicle 100, when operating in the "limp home" mode may further determine whether to immediately transition to a non-autonomous mode of operation as a power-saving strategy.

Figure 4:
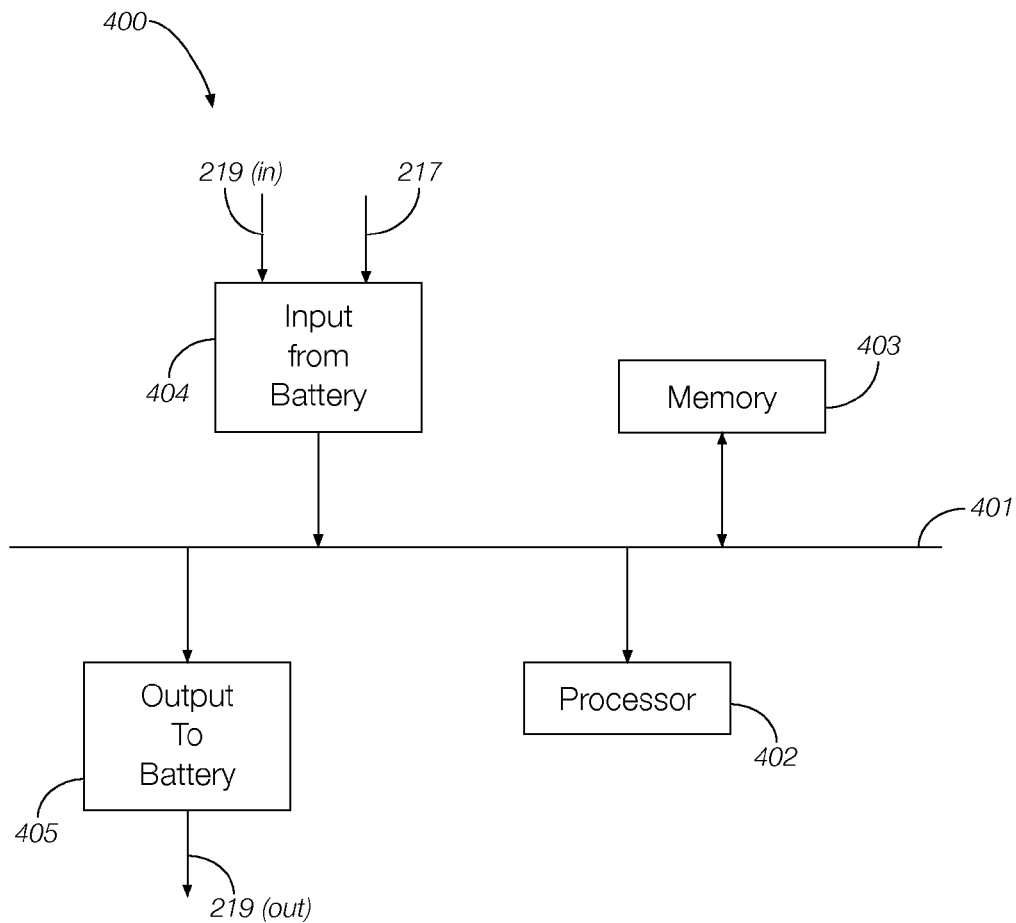
FIG. 4 is a block diagram of computing device for partitioning and interconnection of the distribution of voltaic cells of FIG. 3.

FIG. 4 is block diagram 400 of a computer included in processing device 218 to accomplish partitioning and interconnection of the voltaic cells of FIG. 3. Computer 400 may include a bus 401, a processor 402, a memory 403, an input component 404 and an output component 405. Bus 401 includes a path that permits communication amongst the other components and functionalities of computer 400. Processor 402 may include a processor, microprocessor, or processing logic to interpret and execute instructions. Memory may include any type of dynamic or non-volatile storage device that can store information and instructions, such as those provided in a dedicated software application, for execution by processor 401. Memory 403 can store an application that has software instructions for switching cells and/or to partition multi-cell battery 103 into particular sizes; alternatively, the partitions can all provide a twelve volts output, as was provided by the automotive battery, but each partition can have a different power level (i.e., different current availability) to accommodate a different load requirement via a different output tab.

Input component 404 receives input configuration information from battery 103 on bus 219 (in) to know the current configuration state of cell partitions and their connections (if any) to output tabs, as well as to know other interconnections between and amongst the cell matrix 201. Input component 404 also receives any alarm signal from line 217 indicating a subsystem power loss. In response to the alarm signal, output component 405 provides output commands on line 219 (out) to battery 103, if needed, to make a change to the current cell partitions and/or their tab connections, as well as to the cell interconnections, to permit battery 103 to provide substitute power to the subsystem load in need.

Figure 5:
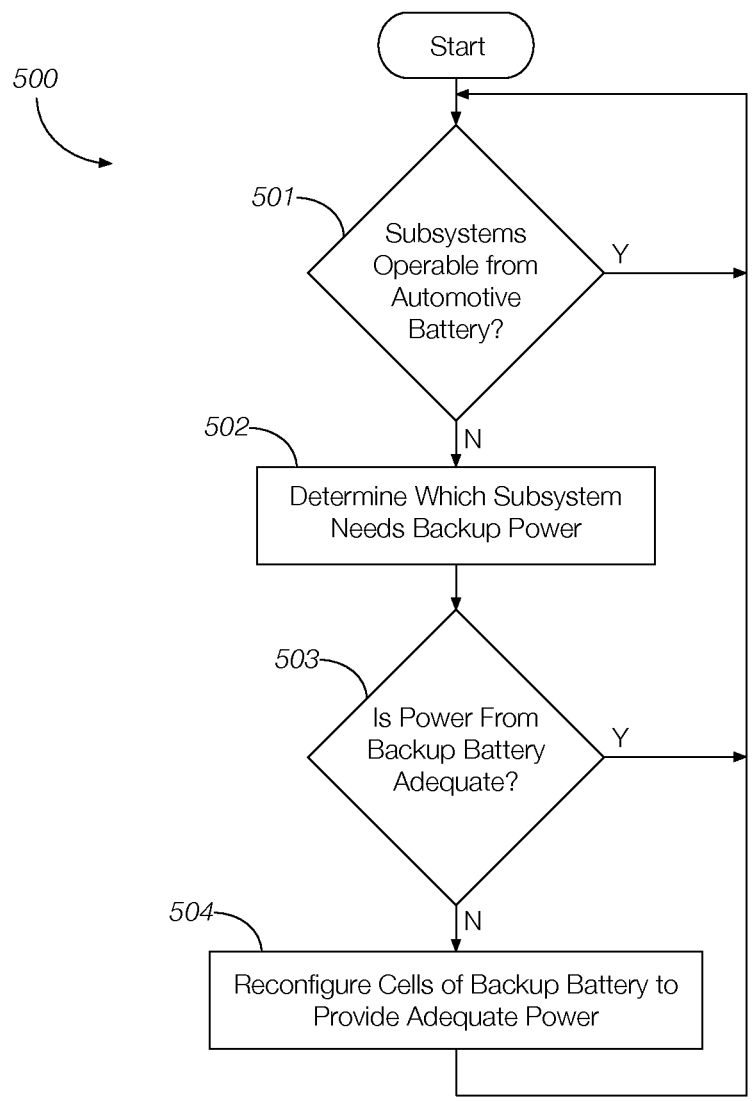
FIG. 5 is a flowchart an exemplary process implemented by operation of one or more components of the vehicle.

FIG. 5 is a flowchart depicting methodology implemented by operation of the embodiments of the present invention. The process starts with query block 501: are all subsystems of hybrid vehicle 100 (FIG. 1) operable under normal power 102 from automotive battery 101? If "yes," then no help is needed from hybrid battery 103 and the process returns to "start" to resume the query of block 501. But, if "no," the algorithmic process moves to block 502. Therein, a determination is made regarding which subsystem (i.e., first load 209 through fourth load 212 in FIG. 2) is in need of backup power because of failure/deterioration of output power 102 from automotive battery 101. As previously noted, the number of subsystems is not limited to four.

After that determination is made, the algorithmic process moves to another query block 503 which asks: is the failed subsystem receiving adequate backup power from hybrid battery 103 under existing configurations of the cell partitions and interconnected cells of the battery? If "yes," the process returns to "start" to resume the query of block 501. For example, with reference to FIG. 2, if automotive power to first load 209 had failed, causing a signal to be sent on line 217 to processing device 218 which, in turn, made a determination by way of its computer operation that the information received from matrix 201 through input component 404 discloses that the current configuration of voltaic cells is appropriate and properly connected to either tab 202 or 203 to supply adequate backup power to first load 209, then no commands need be issued by processing device 218 via line 219 and the process returns to "start" to resume the query of block 501.

But, if "no," the algorithmic process moves to block 504. Therein, the current cell configuration and partitioning may be rearranged and/or connections from the cells to the hybrid battery's output voltage tab connecting to the failed subsystem may be changed, to provide adequate backup power to the failed subsystem. In the above example, if automotive power to first load 209 had failed, causing a signal to be sent on line 217 to processing device 218 which, in turn, made a determination by way of its computer operation that the information received from matrix 201 through input component 404 discloses that the current configuration of voltaic cells is not appropriate and not properly connected to either tab 202 or 203 to supply adequate backup power to first load 209, then the process of block 504 requires computer 400 to send appropriate commands from output 405 via output line 219 to battery 103 to reconfigure the cell matrix and/or the partitions to accomplish the necessary backup power to the first load 209.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The present invention is thus not to be interpreted as being limited to particular embodiments and the specification and drawings are to be regarded in an illustrative rather than restrictive sense.

The invention claimed is:

1. A system comprising:
a first battery configured to power at least one vehicle subsystem;
a second battery configured to power an electric motor to propel a vehicle, the second battery having a plurality of predetermined partitions and a plurality of tabs, wherein each predetermined partition is associated with a particular voltage and wherein each of the plurality of tabs is electrically connected to at least one of the predetermined partitions; and
a processing device powered by both the first battery and the second battery and configured to detect an inadequate power level provided from the first battery to the at least one vehicle subsystem and selectively route power from one of the plurality of predetermined partitions of the second battery to power the electric motor and the at least one vehicle subsystem by selectively connecting at least one of the tabs to the at least one vehicle subsystem.

2. The system of claim 1, wherein the processing device is configured to command the second battery to provide a substitute voltage to the at least one vehicle subsystem.

3. The system of claim 2, wherein the substitute voltage is output at a power level in accordance with the power demands of the at least one vehicle subsystem.

4. The system of claim 1, wherein the second battery includes a plurality of cells arranged to output the particular voltage.

5. The system of claim 4, wherein the processing device is configured to partition the second battery by connecting at least two of the plurality of cells in series.

6. The system of claim 4, wherein the processing device is configured to partition the second battery by connecting at least two of the plurality of cells in parallel.

7. The system of claim 4, wherein at least two of the plurality of cells are directly connected to the at least one subsystem via at least one of the plurality of tabs.

8. The system of claim 4, further comprising a relay switch configured to connect at least one of the partitions to the subsystem via at least one of the plurality of tabs, wherein the relay switch is configured to operate in response to a command from the processing device.

9. The system of claim 1, wherein at least one of the plurality of tabs is configured to output power approximately equal to a power requirement of the at least one subsystem.

10. The system of claim 1, wherein the at least one subsystem includes a computerized monitor configured to monitor a power level provided to the subsystem from the first battery.

11. The system of claim 10, wherein at least one of the computerized monitor and the processing device is configured to determine whether the power level provided to the subsystem from the first battery is inadequate.

12. A vehicle comprising:
a first battery configured to power at least one vehicle subsystem;
a second battery having a plurality of predetermined partitions, each associated with a particular voltage, wherein the second battery is configured to power an electric motor to propel a vehicle; and
a processing device powered by the first battery and the second battery and configured to detect an inadequate power level provided from the first battery to the at least one vehicle subsystem and selectively route power from one of the plurality of predetermined partitions of the second battery to power both the electric motor and the at least one vehicle subsystem, wherein the processing device is configured to command the second battery to continue to provide power to the electric motor and to provide a substitute voltage, in accordance with the particular voltage of at least one of the predetermined partitions, to the at least one vehicle subsystem.

13. The system of claim 12, wherein the substitute voltage is output at a power level in accordance with the power demands of the at least one vehicle subsystem.

14. The system of claim 12, wherein the processing device is configured to partition the second battery by selectively connecting the at least one vehicle subsystem to tabs associated with at least two of the plurality of cells.

15. The system of claim 12, wherein the processing device is configured to partition the second battery by connecting at least two of the plurality of cells in at least one of a series configuration and a parallel configuration.

16. The system of claim 12, wherein at least two of the plurality of cells are associated with a voltage tab, each voltage tab configured to output power approximately equal to a power requirement of the at least one subsystem.

17. A method, comprising:
monitoring power supplied to at least one vehicle subsystem from a first battery;
detecting loss of the power to the subsystem below a predetermined threshold;
determining, via a processing device, if a second battery can supply adequate power to the at least one vehicle subsystem, the second battery having a plurality of predetermined partitions, each associated with a particular voltage, wherein the processing device is powered by the first battery and the second battery; and
selectively connecting at least one of the predetermined partitions of the second battery to the vehicle subsystem to supply adequate power to both an electric motor and the at least one vehicle subsystem systems.

18. The method of claim 17, wherein partitioning the second battery includes connecting at least two of the plurality of cells in at least one of a series configuration and a parallel configuration.

19. The method of claim 17, wherein at least two of the plurality of cells are associated with a voltage tab, each voltage tab configured to output power approximately equal to a power requirement of the at least one subsystem.

* * * * *